(12) United States Patent
Ikimi

(10) Patent No.: US 6,307,760 B1
(45) Date of Patent: Oct. 23, 2001

(54) THREE LEVEL INVERTER APPARATUS

(75) Inventor: Takashi Ikimi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/653,064

(22) Filed: Sep. 1, 2000

(30) Foreign Application Priority Data

Feb. 25, 2000 (JP) ................................................ 12-049617

(51) Int. Cl.$^7$ ...................................................... H02J 1/02
(52) U.S. Cl. ................................................. 363/39; 363/37
(58) Field of Search ................................ 363/34, 35, 37, 363/39, 47

(56) References Cited

U.S. PATENT DOCUMENTS

| | | | |
|---|---|---|---|
| 5,621,628 | * 4/1997 | Miyazaki et al. | 363/37 |
| 5,644,483 | * 7/1997 | Peng et al. | 363/37 |
| 5,726,550 | * 3/1998 | Inaniwa et al. | 318/803 |
| 6,111,770 | * 8/2000 | Peng | 363/131 |
| 6,191,676 | * 2/2001 | Gabor | 336/160 |

FOREIGN PATENT DOCUMENTS

| | | |
|---|---|---|
| 11-18435 | 1/1999 | (JP) . |
| 11-46481 | 2/1999 | (JP) . |

* cited by examiner

*Primary Examiner*—Peter S. Wong
*Assistant Examiner*—Gary L. Laxton
(74) *Attorney, Agent, or Firm*—Kenyon & Kenyon

(57) ABSTRACT

A three level inverter apparatus for suppressing a resonance current flowing therethrough, to thus improve its conversion efficiency and operational stability. This inverter apparatus includes a converter 1 for converting AC power source power to DC power, an inverter for converting thus converted DC power to AC power, and a DC link for interconnecting these converter and inverter. This DC link has two first smoothing capacitors connected in series between a positive-polarity potential bus P and a negative-polarity potential bus N for storing DC power obtained by the converter 1 and two second smoothing capacitors connected in series between the positive-polarity potential bus P and the negative-polarity potential bus N for storing DC power to be supplied to the inverter. The positive-polarity and negative-polarity potential buses each have a resonance-suppressing reactor inserted therein and the intermediate-potential bus, a resonance-suppressing resistor inserted therein.

2 Claims, 4 Drawing Sheets

THREE LEVEL INVERTER APPARATUS

BACKGROUND OF THE INVENTION

1. Field of the Invention

The present invention relates to a power converter for generating variable-frequency power from electric power of AC power source.

2. Description of the Related Art

An inverter apparatus is widely used as a power converter for driving AC motors and, for large capacity use in particular, three level inverter apparatus is generally utilized.

A typical inverter apparatus comprises a DC portion of a converter for converting AC power source power into DC power, a DC portion of an inverter for converting DC power into AC power, and a DC bus of a DC link portion which interconnects the former two portions. The DC portion of the converter and that of the inverter have their respective smoothing capacitors, in such a way that if a resonance frequency of a resonance circuit constituted by capacitance of these two smoothing capacitors and inductance of the DC bus approaches a switching frequency of the converter or the inverter, a large resonance current flows through the resonance circuit, thus generating heat by the DC bus and the smoothing capacitors. To prevent such heating, a three level inverter apparatus described for example in Japanese Patent Publication No. 18435/1999 has such a configuration that the PWM switching frequency of its converter and inverter is set at not more than $1/\sqrt{2}$ of the primary resonance frequency of its DC link portion. Also, Japanese Patent Publication No. 46481/1999 describes such a configuration of a parallel multiple inverter apparatus in which a plurality of inverters is interconnected by a DC circuit that a resonance current may be suppressed by inserting a dumping resistor to both a positive-polarity potential bus and a negative-polarity potential bus of the three DC buses.

In the case of a large capacity inverter apparatus, the capacitance of its smoothing capacitor becomes large as well as the size of the apparatus itself, with a resultant increase in the magnitude of the inductance of the DC bus, thus decreasing the resonance frequency of the DC bus. In such a case, a prior art described in the above-mentioned Japanese Patent Publication No. 18435/1999 needs to decrease the PWM switching frequency correspondingly, which, however, distorts the output waveform of the inverter, thus problematically increasing vibration of the load motor.

Also, another prior art described in Japanese Patent Publication No. 46481/1999 has such a problem that a current flowing through resistors inserted to the positive-polarity and negative-polarity potential buses brings about a large loss, thus decreasing the conversion efficiency of the inverter apparatus.

SUMMARY OF THE INVENTION

In view of the above, it is an object of the present invention to suppress a resonance current flowing through the DC bus of a three level inverter apparatus, thus improving the conversion efficiency and the operational stability.

This object can be achieved by a three level inverter apparatus which comprises a converter for converting AC power source power to DC power, an inverter for converting thus converted DC power to AC power, and a DC link for interconnecting these converter and inverter, in which the DC link has two first smoothing capacitors connected in series between a positive-polarity potential bus and a negative-polarity potential bus for storing DC power obtained from the converter and two second smoothing capacitors connected in series between these positive-polarity and negative-polarity potential buses for storing DC power to besupplied to the inverter, in such a configuration that an interconnection point of the above-mentioned two first smoothing capacitors and that of the above-mentioned two second smoothing capacitors are interconnected by an intermediate potential bus, which has in turn a resistor inserted therein for controlling resonance.

Since this three level inverter apparatus can use its resonance-suppressing resistor to decrease a resonance current flowing through a resonance path comprising the first and second smoothing capacitors and the intermediate potential bus, it is possible to suppress heating and efficiency degradation due to resonance even if the switching frequency of the converter or the inverter is close to the resonance frequency of that resonance path. Also, a current corresponding to a difference between a positive-polarity bus current and a negative-polarity bus current flows through the intermediate potential bus located at the DC neutral point, but it is rather small in magnitude as compared to the resonance current, thus causing only a small loss due to the resistors inserted with a resultant slight decrease in the efficiency of the inverter apparatus. Also, the above-mentioned object can be achieved by another three level inverter apparatus which comprises a converter for converting AC power source power to DC power, an inverter for converting thus converted DC power to AC power, and a DC link for interconnecting these converter and inverter, in which this DC link has two first smoothing capacitors connected in series between the positive-polarity potential bus and the negative-polarity potential bus for storing DC power obtained from the converter and two second smoothing capacitors connected in series between the above-mentioned positive-polarity and negative-polarity potential buses for storing DC power to be supplied to the above-mentioned inverter in such a configuration that an interconnection point of the above-mentioned two first smoothing capacitors and that of the above-mentioned two second smoothing capacitors are interconnected by an intermediate potential bus, with a reactor inserted to both the above-mentioned positive-polarity and negative-polarity potential buses for controlling resonance.

This three level inverter apparatus can use inductance of the reactor thus inserted, to change the resonance frequency of the resonance path constituted by the first and second smoothing capacitors and the positive-polarity and negative-polarity buses. Therefore, the gap between the switching frequency of the converter or the inverter and the resonance frequency of that resonance path can be made larger to suppress heating and efficiency degradation due to resonance.

DESCRIPTION OF THE EMBODIMENTS

Figure 2:
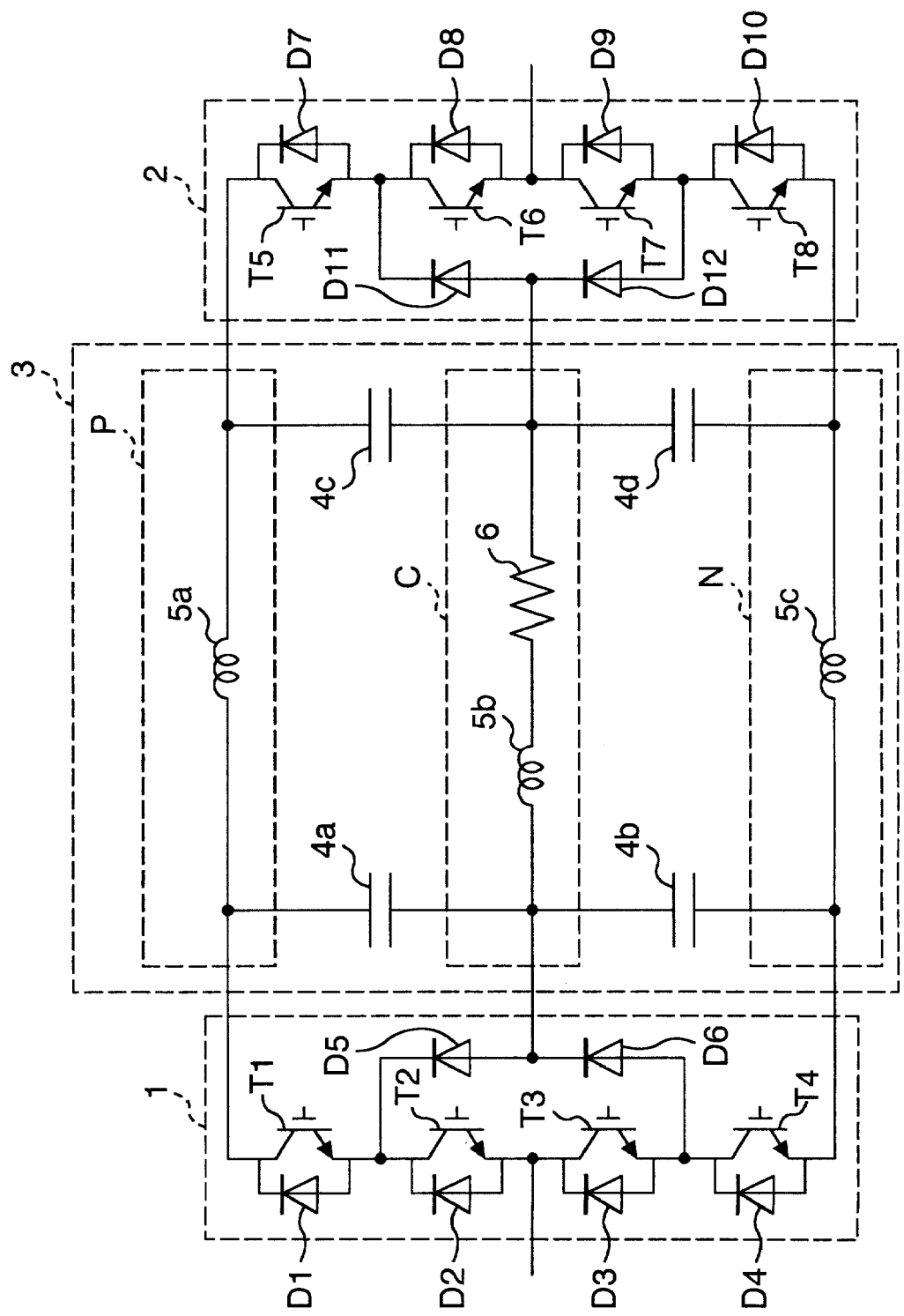
FIG. 2 is a configuration diagram of a first embodiment of the three level inverter apparatus of the present invention.

FIG. 2 shows a configuration of a first embodiment of a three level inverter apparatus according to the present invention. This inverter apparatus comprises a three level converter 1 for converting an AC voltage from a power source to a DC voltage, a three level inverter 2 for converting the DC voltage to an AC voltage, and a DC link portion 3 for interconnecting these converter and inverter.

The three level converter 1 has diodes D1 through D4 connected in series between later-described plus-potential bus and minus-potential bus, diodes D5 and D6 connected in series between the interconnection point of the diodes D1 and D2 and that of the diodes D3 and D4, and bypass transistors T1 through T4 provided across the diodes D1 through D4 respectively. The interconnection point of the diodes D2 and D3 is connected to an AC input.

The three level inverter 2 has diodes D7 through D10 connected in series between the plus-potential and minus-potential buses, diodes D11 and D12 connected in series between an interconnection point of the diodes D7 and D8 and that of the diodes D9 and D10, and bypass transistors T5 through T8 provided across the diodes D7 through D10 respectively. The interconnection point of the diodes D8 and D9 is connected to an AC output.

The DC link portion 3 has a plus-potential bus P, an intermediate-potential bus C, and a minus-potential bus N. On the DC output side of the converter 1 are provided two smoothing capacitors 4a and 4b connected in series between the plus-potential bus P and the minus-potential bus N, while on the DC input side of the inverter 2 are provided smoothing capacitors 4c and 4d connected in series between the plus-potential bus P and the minus-potential bus N.

The plus-potential bus P is connected to both the cathode side of the diode D1 and that of the diode D7, the minus-potential bus N is connected to both the anode side of the diode D4 and that of the diode D12, and the intermediate-potential bus C is connected both to the interconnection point of the diodes D5 and D6 via the interconnection point of the smoothing capacitors 4a and 4b and to the interconnection point of the diodes D11 and D12 via the interconnection point of the smoothing capacitors 4c and 4d.

The plus-potential bus P includes wiring conductance 5a, the intermediate-potential bus C includes wiring inductance 5b and also a resonance-suppressing resistor 6 inserted therein, and the minus-potential bus includes wiring inductance 5c.

Figure 3:
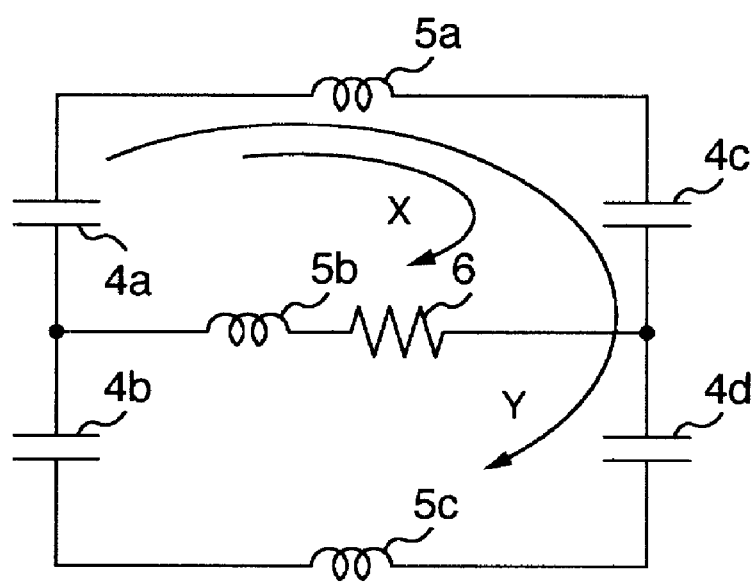
FIG. 3 is an equivalent circuit diagram for explaining a resonance path of the apparatus of FIG. 2.

The following will describe the operations of two resonance paths X and Y in the DC link portion 3 with reference to FIG. 3. The resonance path X circulates along the smoothing capacitor 4a, the wiring inductance 5a, the smoothing capacitor 4c, the resonance-suppressing resistor 6, and the wiring inductance 5b in this order. The resonance path Y, on the other hand, circulates along the smoothing capacitor 4a, the wiring inductance 5a, the smoothing capacitors 4c and 4d, the wiring inductance 5c, and the smoothing capacitor 4b in this order.

Supposing the static capacitance of the respective smoothing capacitors 4a through 4d to be C, the value of the respective DC bus wiring inductance pieces 5a through 5c to be Lb, and the resistance of the resonance-suppressing resistor to be Rc, angular resonance frequencies $\omega_x$ and $\omega_y$ of the resonance paths X and Y respectively are given by the following equations (1) and (2), respectively:

$$\omega_x = \frac{1}{\sqrt{3L_b \times \frac{1}{2}C}} = \frac{1}{\sqrt{\frac{3}{2}L_bC}} \quad (1)$$

$$\omega_y = \frac{1}{\sqrt{2L_b \times \frac{1}{4}C}} = \frac{1}{\sqrt{\frac{1}{2}L_bC}} \quad (2)$$

Figure 4:
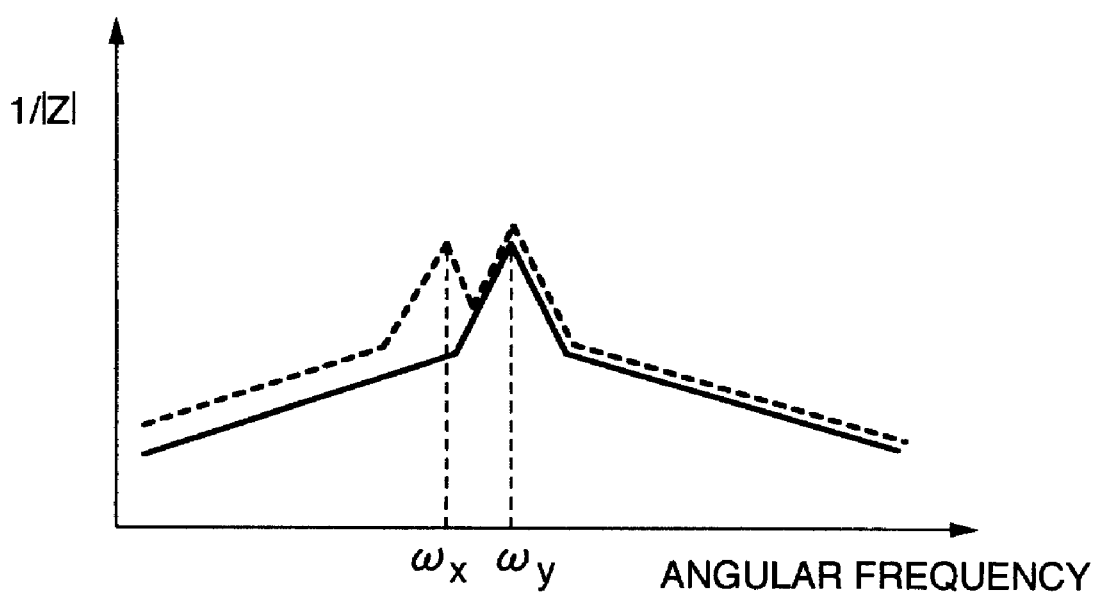
FIG. 4 is a graph for explaining the resonance characteristics of the apparatus of FIG. 2.

FIG. 4 shows the resonance characteristics of the DC link portion as viewed from the three level converter 1. The solid line in the drawing represents the resonance characteristics when the resonance-suppressing resistor 6 is inserted and the broken line, those when it is not inserted. As can be seen from FIG. 4, when the resonance-suppressing resistor 6 is inserted, the resonance current decreases near the angular resonance frequency $\omega_x$. Since the intermediate-potential bus C develops only a current component for adjusting a balance between the plus-potential side DC voltage and the minus-potential side DC voltage of the DC link portion 3, the loss is increased only a little which is brought about by inserting the resonance-suppressing resistor to the intermediate-potential bus.

In the above-mentioned embodiment, even when the PWM switching frequency of the converter 1 or the inverter 2 is lowered close to the angular resonance frequency $\omega_x$, the resonance current can be prevented from increasing at the DC link portion, thus suppressing the loss generated at the smoothing capacitors and the DC buses to thereby provide a higher efficiency and stable operations.

Figure 1:
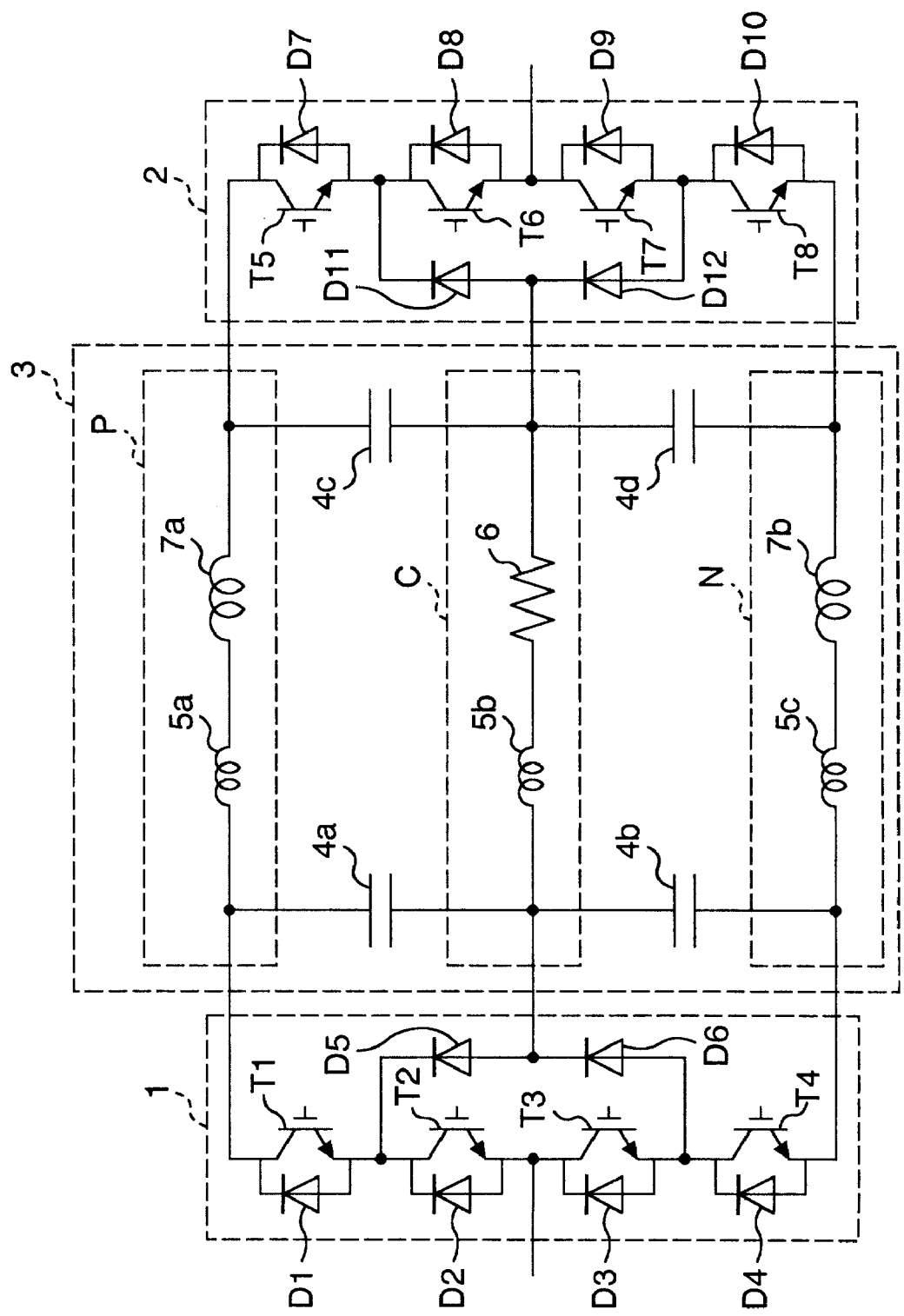
FIG. 1 is a configuration diagram of a second embodiment of a three level inverter apparatus of the present invention.

The following will describe a second embodiment of the three level inverter apparatus according to the present invention with reference to FIG. 1. The like elements are given the like reference numerals in FIGS. 1 and 2. The apparatus according to this embodiment is different from that of FIG. 2 in that the plus-potential bus P and the minus-potential bus N have resonance-suppressing reactors 7a and 7b inserted therein respectively.

Figure 5:
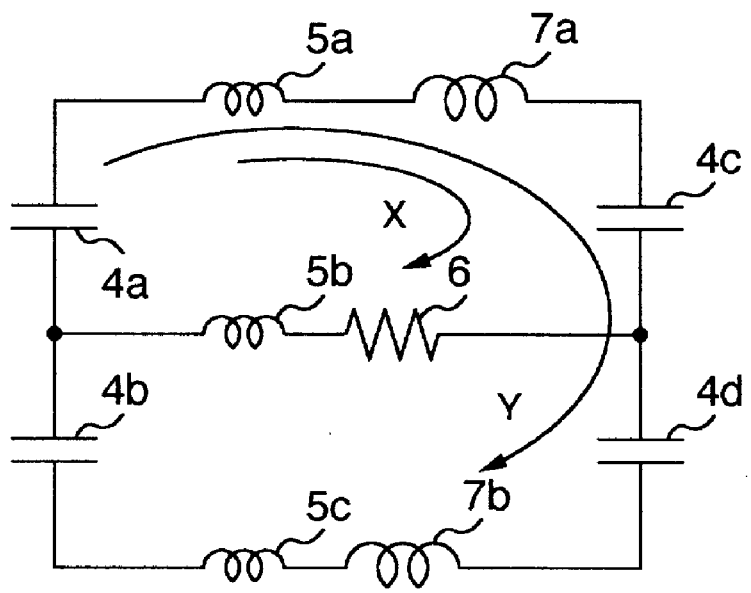
FIG. 5 is an equivalent circuit diagram for explaining a resonance path of the apparatus of FIG. 1.

The following will describe about the two resonance paths X and Y in the DC link portion 4 of FIG. 1 with reference to FIG. 5. The resonance path X circulates along the smoothing capacitor 4a, the wiring inductance 5a, the resonance-suppressing reactor 7a, the smoothing capacitor 4c, the resonance-suppressing resistor 6, and the wiring inductance 5b in this order. The resonance path Y, on the other hand, circulates along the smoothing capacitor 4a, the wiring inductance 5a, the resonance-suppressing reactor 7a, the smoothing capacitors 4c and 4d, the resonance-suppressing reactor 7b, the wiring inductance 5c, and the smoothing capacitor 4b in this order.

Supposing the static capacitance of the respective smoothing capacitors 4a through 4d to be C, the value of the respective DC bus wiring inductance pieces 5a through 5c to be Lb, the resistance of the resonance-suppressing resistor 6 to be Rc, and the value of the respective resonance-suppressing reactors 7a and 7b to be Lc, the angular resonance frequencies $\omega_x$ and $\omega_y$ of the resonance paths X and Y respectively are given by the following equations (3) and (4), respectively:

$$\omega_x = \frac{1}{\sqrt{(3L_b + L_c) \times \frac{1}{2}C}} = \frac{1}{\sqrt{\frac{1}{2}(3L_b + L_c)C}} \quad (3)$$

$$\omega_y = \frac{1}{\sqrt{(2L_b + 2L_c) \times \frac{1}{4}C}} = \frac{1}{\sqrt{\frac{1}{2}(L_b + L_c)C}} \quad (4)$$

Figure 6:
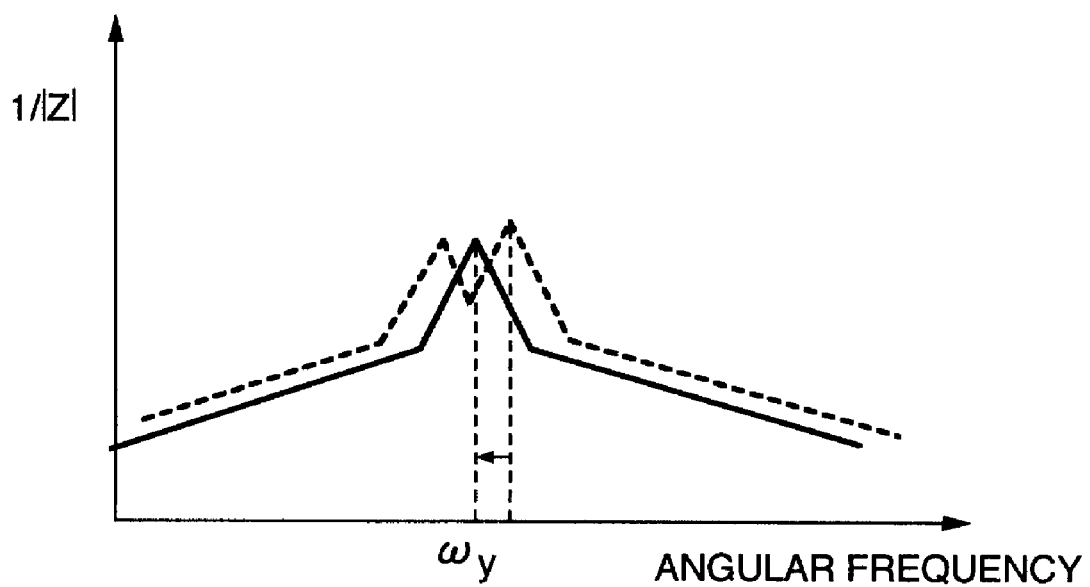
FIG. 6 is a graph for explaining the resonance characteristics of the apparatus of FIG. 1.

FIG. 6 is a graph showing the resonance characteristics of the DC link portion 3 as viewed from the three level converter 1. The solid line in the drawing represents the characteristics when the resonance-suppressing resistor 5 and the resonance-suppressing reactors 7a and 7b are inserted and the broken line, those when they are not inserted. By inserting the resonance-suppressing resistor 6, the current flowing through the resonance path X can be suppressed, thus reducing a resonance current near the angular resonance frequency $\omega_x$. Also, by inserting the resonance-suppressing reactors, the angular resonance frequency $\omega_y$ of the resonance path Y can be reduced.

By setting the angular resonance frequency $\omega_y$, which can be set arbitrarily by adjusting the inductance values of the resonance-suppressing reactors 7a and 7b, at such a value as not to coincide with the switching frequency of the converter 1 or that of the inverter 2, the loss generated at the smoothing capacitors and the DC buses can be reduced, thus achieving a higher efficiency and stable operations.

The embodiments of the present invention make it possible to suppress the resonance current flowing through the DC buses of the three level inverter apparatus and improve the conversion efficiency and the operational stability.

What is claimed is:

1. A three level inverter apparatus comprising:

a converter for converting AC power source power to DC power;

an inverter for converting the DC power to AC power; and a DC link for interconnecting the converter and the inverter, wherein the DC link has two first smoothing capacitors connected in series between a positive-polarity potential bus and a negative-polarity potential bus for storing DC power obtained by the converter and two second smoothing capacitors connected in series between the positive-polarity potential bus and the negative-polarity potential bus for storing DC power to be supplied to the inverter; and an interconnection point between the two first smoothing capacitors and an interconnection point between the two second smoothing capacitors are interconnected by an intermediate-potential bus, the intermediate-potential bus having a resistor inserted therein for controlling resonance.

2. A three level inverter apparatus comprising:

a converter for converting AC power source power to DC power;

an inverter for converting the DC power to AC power; and a DC link for interconnecting the converter and the inverter, wherein the DC link has two first smoothing capacitors connected in series between a positive-polarity potential bus and a negative-polarity potential bus for storing DC power obtained by the converter and two second smoothing capacitors connected in series between the positive-polarity potential bus and the negative-polarity potential bus for storing DC power to be supplied to the inverter; and an interconnection point between the two first smoothing capacitors and an interconnection point between the two second smoothing capacitors are interconnected by an intermediate-potential bus; and the positive-polarity potential bus and the negative-polarity potential bus each have a reactor inserted therein for controlling resonance.

* * * * *